United States Patent [19]

Hermann

[11] Patent Number: 5,762,690
[45] Date of Patent: Jun. 9, 1998

[54] DEHUMIDIFIER FOR SUPPLYING AIR USING VARIABLE FLOW RATE AND VARIABLE PRESSURE IN A MEMBRANE DRYER

[75] Inventor: Kerstan G. Hermann, Lucas, Tex.

[73] Assignee: Andrew Corporation, Orland Park, Ill.

[21] Appl. No.: 981,191

[22] Filed: Nov. 25, 1992

[51] Int. Cl.$^6$ ............................. B01D 53/22; B01D 53/26
[52] U.S. Cl. ............................. 96/4; 96/8; 55/216; 55/270
[58] Field of Search ............................. 55/16, 18, 21, 55/68, 158, 164, 216, 270; 95/19, 22–24, 45, 52; 96/4, 7–10

[56] References Cited

U.S. PATENT DOCUMENTS

| | | | |
|---|---|---|---|
| 2,779,173 | 1/1957 | Wurtz . | |
| 3,133,132 | 5/1964 | Loeb et al. | 264/49 |
| 3,499,062 | 3/1970 | Geary, Jr. et al. | 264/36 |
| 3,511,031 | 5/1970 | Ketteringham et al. | 55/158 |
| 3,536,611 | 10/1970 | de Filippi et al. | 210/22 |
| 3,556,305 | 1/1971 | Shorr | 210/490 |
| 3,556,992 | 1/1971 | Massucco | 210/23 |
| 3,580,841 | 5/1971 | Cadotte et al. | 210/23 |
| 3,615,024 | 10/1971 | Michaels | 210/490 |
| 3,616,607 | 11/1971 | Klass et al. | 55/16 |
| 3,657,113 | 4/1972 | Stancell et al. | 210/23 |
| 3,676,203 | 7/1972 | Sachs et al. | 117/123 |
| 3,735,558 | 5/1973 | Skarstrom et al. | 55/16 |
| 3,735,559 | 5/1973 | Salemme | 55/16 |
| 3,775,303 | 11/1973 | McKinny et al. | 208/210 |
| 3,874,986 | 4/1975 | Browall et al. | 161/160 |
| 3,892,665 | 7/1975 | Steigelmann et al. | 210/490 |
| 3,899,309 | 8/1975 | Hoehn et al. | 29/16 |
| 3,922,149 | 11/1975 | Ruder et al. | 55/21 |
| 3,930,814 | 1/1976 | Gessner | 55/21 X |
| 4,108,765 | 8/1978 | Lee | 210/23 |
| 4,142,966 | 3/1979 | Perry | 210/22 |
| 4,157,960 | 6/1979 | Chang et al. | 210/23 |
| 4,230,463 | 10/1980 | Henis et al. | 55/16 |
| 4,311,594 | 1/1982 | Perry | 210/640 |
| 4,397,661 | 8/1983 | King et al. | 55/158 |
| 4,421,529 | 12/1983 | Revak et al. | 55/16 |
| 4,472,175 | 9/1984 | Malon et al. | 55/16 |
| 4,486,202 | 12/1984 | Malon et al. | 55/158 |
| 4,497,640 | 2/1985 | Fournie et al. | 55/16 |
| 4,549,888 | 10/1985 | Fannin | 55/163 |
| 4,575,385 | 3/1986 | Brooks et al. | 55/158 |

(List continued on next page.)

FOREIGN PATENT DOCUMENTS

| | | |
|---|---|---|
| 51-469 | 11/1980 | European Pat. Off. . |
| 0030863 | 6/1981 | European Pat. Off. . |
| 1919290B2 | 6/1980 | Germany . |
| 6 0238-119-A | 5/1984 | Japan . |
| 6 2042-723-A | 8/1985 | Japan . |
| 6 2191-404-A | 2/1986 | Japan . |
| 6 2273-028-A | 5/1986 | Japan . |
| 6 3123-421-A | 11/1986 | Japan . |
| 6 3123-422-A | 11/1986 | Japan . |
| 6 3236-517-A | 3/1987 | Japan . |
| 6 3296-819-A | 5/1987 | Japan . |
| 1271-522-A | 5/1985 | U.S.S.R. . |

*Primary Examiner*—Robert Spitzer
*Attorney, Agent, or Firm*—Arnold, White & Durkee

[57] ABSTRACT

The present invention utilizes a membrane cartridge that removes water vapor or fluid from air that passes through the cartridge. The longer the air remains within the cartridge, the more fluid is removed from the air. Consequently, as the air becomes "drier", the dew point temperature of the air also falls. The present invention permits decreases in the flow rate and system pressure while providing dehumidified air with the desired dew point temperature. These decreases in pressure and flow rate result from increased elevation or system wear. The decrease in system pressure and flow rate increases the residence time of the air in the membrane cartridge. As a result, the dew point temperature of the dehumidified air remains stable because increased residence time increases the amount of fluid removed from the air, which tends to reduce the dew point temperature of the dehumidified air.

17 Claims, 1 Drawing Sheet

U.S. PATENT DOCUMENTS

| | | | |
|---|---|---|---|
| 4,583,996 | 4/1986 | Sakata et al. | 55/16 |
| 4,597,777 | 7/1986 | Graham | 55/16 |
| 4,614,524 | 9/1986 | Kraus | 55/16 |
| 4,654,055 | 3/1987 | Malon et al. | 55/158 |
| 4,685,941 | 8/1987 | Sato | 55/163 |
| 4,687,578 | 8/1987 | Stookey | 210/321.1 |
| 4,718,921 | 1/1988 | Makino et al. | 55/16 |
| 4,728,345 | 3/1988 | Murphy | 55/158 |
| 4,783,201 | 11/1988 | Rice et al. | 55/16 |
| 4,806,132 | 2/1989 | Campbell | 55/16 |
| 4,813,474 | 3/1989 | Umezu . | |
| 4,844,719 | 7/1989 | Toyomoto et al. | 55/16 |
| 4,857,082 | 8/1989 | DiMartino, Sr. et al. | 55/16 |
| 4,863,492 | 9/1989 | Doshi et al. | 55/16 |
| 4,944,776 | 7/1990 | Keyser et al. | 55/16 |
| 5,030,251 | 7/1991 | Rice et al. | 55/16 |
| 5,053,058 | 10/1991 | Mitariten | 55/18 X |
| 5,118,327 | 6/1992 | Nelson et al. | 55/16 |
| 5,131,929 | 7/1992 | Brockmann et al. | 55/16 |

DEHUMIDIFIER FOR SUPPLYING AIR USING VARIABLE FLOW RATE AND VARIABLE PRESSURE IN A MEMBRANE DRYER

FIELD OF THE INVENTION

The present invention relates generally to dehumidifying systems that use a membrane cartridge for dehumidifying gases. More particularly, the present invention relates to a dehumidifying system that maintains a certain dew point for a gas without regard to the ambient pressure.

BACKGROUND OF THE INVENTION

Dehumidifying systems are used in a variety of different applications. For example, air dehumidifying systems are used in applications ranging from dehumidification of offices for maintaining comfortable working areas during summer months to providing dry air for dental tools. Different applications often require different levels of humidity. A humidity level of about 40% to 60% is comfortable in homes or offices, while a humidity level of less than 10% is desirable in certain laboratory situations. Even lower humidity levels are often desirable in communications systems.

Commonly used signal transmission media in communications systems are waveguide, coaxial cable, multi-wire telephone cables, and optical fiber cables. Changing environmental conditions can affect the overall performance of a system using any of these media. For example, when the temperature of air inside a waveguide or other transmission medium falls below its dew point, condensation occurs inside the transmission line. Condensation lowers the efficiency of waveguide and coaxial cable systems partially because the dielectric constant of water is greater than the dielectric constant of air, and partially because the condensation alters the impedance of the waveguide or coaxial cable and may produce signal variation or loss. In multi-wire cables, condensation can lower the insulation resistance and introduce undesirable leakage paths.

To prevent the accumulation of moisture in such systems, the transmission line is normally sealed and pressurized to prevent the ingress of moisture through any small gaps. To prevent condensation within the system, the pressurization is effected with dry air from a dehumidifier or dehydrator. A compressor or pump typically supplies the pressurized air, and the dehumidifying apparatus removes moisture from the pressurized air before it is injected into the system. The low moisture content of the air lowers the dew point so that condensation does not take place except at very low temperatures Moreover, due to the small amount of moisture present in the injected air, only a small amount of condensate can form even at unusually low temperatures.

One of the known types of dehumidifiers uses a membrane cartridge to remove fluid from a gas that passes through the membrane cartridge. The membrane cartridge contains multiple membranes through which moisture and a portion of the gas being dried permeate the membrane and escape to the atmosphere or a collection system. The membranes are typically in the form of hollow fibers so that a gas may be passed through the interiors of the fibers while moisture removed from the gas is collected from the exteriors of the fibers.

Present dehumidifiers that use membrane cartridges generally use a compressor to supply pressurized air to the membrane cartridge. In a typical dehumidifier of this type, the desired dew point of the dehumidified gas is achieved by maintaining a constant flow rate of the gas through the membrane cartridge while keeping the pressure constant. These systems require relatively large compressors in order to maintain a constant flow rate and pressure within the dehumidifying system at higher elevations, i.e. at relatively low ambient pressures.

SUMMARY OF THE INVENTION

A primary object of this invention is to provide a dehumidifying system that uses a membrane dryer to remove fluid from a gas and permits the gas flow and pressure across the membrane dryer to fluctuate while still maintaining the desired dew point of the gas dehumidified by the membrane dryer.

Another object of the present invention is to provide such a dehumidifying system that requires a smaller pressurized air source and fewer components than existing dehumidifying systems that employ membrane cartridges.

Still another object of the present invention is to provide such a dehumidifying system that maintains an acceptable combination of flow rate and pressure by self-regulation.

Other objects and advantages of the present invention will become apparent upon reading the following detailed description and upon reference to the accompanying drawings.

Accordingly, the present invention relates to an apparatus for dehumidifying air and maintaining a certain dew point temperature for the dehumidified air. The dew point is the temperature at which moisture condenses from the air. Because the primary function of the dehumidifier is to avoid such condensation, it is important that the dew point of the dehumidified air be lower than any expected actual temperature in the space receiving the dehumidified air. The dew point depends on both the moisture content and the pressure of the air.

The present invention utilizes a membrane cartridge that removes water vapor from air that passes through the cartridge. The longer the air remains within the cartridge, the more water is removed from the air. Consequently, as the air becomes "drier", the dew point temperature of the air falls. The present invention permits variations in the flow rate and system pressure while continuing to provide dehumidified air having the desired dew point temperature. Decreases in pressure and flow rate typically result from ambient pressure conditions or system wear. In the system provided by this invention, the residence time of the air in the membrane cartridge is increased as the flow rate decreases. As a result, the dew point temperature of the dehumidified air remains stable because increased residence time increases the amount of moisture removed from the air, which tends to reduce the dew point temperature of the dehumidified air.

In a preferred embodiment of the present invention, a compressor supplies pressurized air to the system. A regulating device or orifice connected to the compressor output releases excess air flow to the atmosphere to account for differences between compressors. The pressurized air passes through a filtration device that removes water from the pressurized air. An automatic float valve, fixed bleed orifice or other acceptable drain method removes the water collected in the filtration device. This filtration device is designed not to divert air flow from the compressor. The filtered air is passed through the membrane cartridge to remove water vapor or other fluid from the air. The water vapor is expelled from the membrane cartridge through a fluid exit, and the dehumidified or dry air exits through a dehumidified air outlet with the desired dew point.

A regulating means creates the necessary system pressure and ensures that the pressure and flow rate follow each other such that as the system pressure decreases, the flow rate decreases, or as the system pressure increases, the flow rate increases. The dehumidifier of the present invention requires that the pressure and flow rate follow each other in a manner such that the combination of pressure and flow rate will always produce dehumidified air having the desired dew point. By selecting the proper size regulating means, compressor and membrane cartridge, the dehumidifier regulates itself because pressure changes will follow flow rate changes in the desired proportion such that the resulting combination of pressure and flow rate produces dehumidified air having the desired dew point temperature. The dehumidifier system will produce dehumidified air at the desired dew point even at high altitudes by maintaining the proper flow rate and pressure combination.

Increased elevation reduces ambient air density, which in turn reduces the output flow rate and pressure from the compressor. The decrease in system pressure causes the membrane cartridge to work less efficiently, but the decrease in flow rate more than compensates for the effects of decreased system pressure because the reduced flow rate leads to an increased residence time of the air within the membrane cartridge. This increased residence time increases the amount of moisture removed from the air, which tends to reduce the dew point temperature of the dehumidified air. Therefore, as the ambient air density decreases with increasing elevation, the residence time of the air in the cartridge increases such that the dew point temperature of the dehumidified air tends to decrease.

In prior dehumidifiers, large compressors were needed to maintain a constant pressure and air flow at higher elevations. These dehumidifiers used a constant pressure so that the dew point of the dry air could be adjusted by altering the air flow. The present invention, however, can operate with smaller compressors and fewer components because maintaining a constant system pressure and flow rate is not necessary. This system also does not vent excessive air flow to the atmosphere from the filtration process.

BRIEF DESCRIPTION OF THE DRAWINGS

The advantages of the present invention will become apparent upon reading the following detailed description and upon reference to the accompanying drawings, in which the single FIGURE is a schematic representation of a dehumidifier of the present invention.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Figure 1:
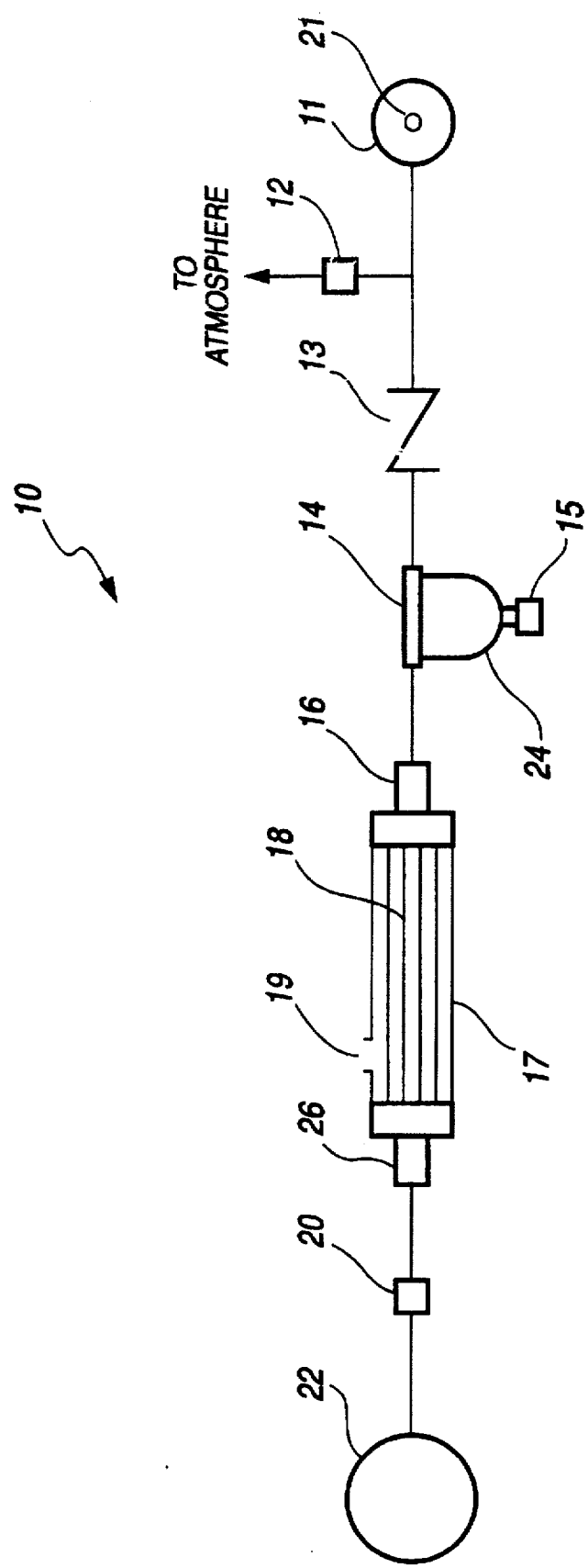

Referring to FIGURE 1, a dehumidifier system is illustrated and generally designated by a reference numeral 10. This system will be described herein with specific reference to the dehumidification of air, but it will be understood that the system is generally applicable to the dehumidification of other gases or gas mixtures such as hydrogen, carbon dioxide, carbon monoxide, helium, nitrogen, oxygen, argon, hydrogen sulfide, nitronic oxides, ammonia, and hydrocarbons of one to five carbon atoms such as methane, ethane and propane.

An air compressor or pump 11 pressurizes air from the atmosphere which enters the compressor 11 through an inlet 21. The pressurized air delivered by the compressor 11 is routed past a restrictive device 12, through a check valve 13 and a filtration device 14 with a drain 15 and to a membrane cartridge 17. The membrane cartridge 17 removes moisture from the pressurized air and routes the dehumidified air through a restrictive device 20 to the inlet of a dry air system 22.

The membrane cartridge 17 utilizes hollow fiber membranes 18 to separate water vapor from air and expel it from the cartridge as water vapor. The hollow fiber membranes 18 allow certain gases to permeate through the fiber and escape, while other gases continue through the hollow portion of the fiber. The hollow fiber membranes 18 extend from a cartridge inlet 16 to a cartridge outlet 26 so that only air which travels within the hollows of the fibers 18 is available for induction into the dry air system 22. Gases, such as water vapor, which permeate through the walls of the fibers, exit the cartridge 17 through a weep hole 19.

The preferred membrane cartridge is commercially sold under the tradename "Prism Cactus" by Permea Inc., Malvern Industrial Park, Box 396, Malvern, Pa. 19355. In a preferred embodiment of the present invention, a Permea membrane cartridge Model PPC21 is used. Using this type of membrane cartridge, gases such as water vapor, hydrogen, helium and carbon dioxide permeate the fiber membrane quickly, while gases such as carbon monoxide, nitrogen and methane permeate the fiber membrane slowly. Therefore, more gases, and greater quantities, are filtered out of air as the air spends more time within the membrane cartridge 17. Consequently, as the air spends more time within the membrane cartridge, the air becomes more dehumidified, and the dew point of the air decreases. The present invention permits decreases in air flow and system pressure due to increased elevation while providing dehumidified air with the desired dew point. The decrease in air flow increases the residence time of the air within the membrane cartridge, resulting in drier air and a reduced dew point in the dehumidified air.

The pressurized air from the compressor 11 flows past a restrictive device such as an orifice 12 which releases excessive air flow from the compressor to the atmosphere. The orifice 12 may be adjusted manually during assembly to account for differences among compressors. Excessive flow rates result in elevated dew points for the dehumidified air because the air spends less time within the membrane cartridge 17. A check valve 13 prevents the loss of dehumidified air by allowing air to pass from the compressor 11 to the membrane cartridge 17 but not in the reverse direction, from the membrane cartridge 17 to the compressor 11. The pressurized air then enters the filtration device 14 that removes liquid water from the air. The liquid water is removed from the air to prevent it from possibly saturating the fiber membranes 18 within the membrane cartridge 17. Saturated fiber membranes cannot filter water vapor from the air, and thus removal of the liquid water prolongs the efficient operation of the membrane cartridge 17. The removed water drips into a bowl 24 and is drained from the bowl 24 through a drain 15. The drain 15 preferably includes an automatic float valve so that it is opened only during those intervals when water is being removed from the filter. This design allows for a smaller size compressor 11 by securing the system from unnecessary losses of pressurized air.

A restrictive device 20 such as an orifice is connected to the dehumidified air outlet 26 to link the system pressure and the flow rate together such that the flow rate and pressure combination produce dehumidified air having a desired dew point. By designing the dehumidifier 10 with the correct size restrictive device 20, compressor 11 and membrane cartridge 17, the dehumidifier 10 will regulate itself because pressure changes will follow flow rate changes in the desired proportion such that the resulting combination of pressure and flow rate produces dehumidified air having the desired dew point temperature. Table 1 illustrates the effect of linking system pressure and flow rate using a 0.014 inch orifice. A preferred embodiment of the present invention uses a 0.014 inch orifice.

If the flow rate decreases due to increased elevation, the system pressure decreases because the system pressure and the flow rate are linked by the restrictive device 20. The system pressure decrease tends to lower the operating efficiency of the membrane cartridge, but the flow rate decrease increases the residence time of the air within the membrane cartridge. Thus, the increased residence time of the air within the membrane cartridge lowers the dew point of the dehumidified air and compensates for the decreased efficiency of the membrane cartridge so that the dew point of the dehumidified air is not adversely affected. The present invention, however, must be designed so that the system pressure and flow rate follow each other properly in order for the dehumidifier to consistently produce air with the proper dew point. For example, if air flow decreases slightly but system pressure drastically falls, the increased residence time of the air within the membrane cartridge will not compensate for the inefficiency of the membrane cartridge at the low pressure, and the dew point of the dehumidified air will rise.

A dehumidifier that uses a compressor for its air source will experience a decrease in compressor output flow rates with increasing elevation. For example, a typical reciprocating oil-less compressor will develop its rated output flow rate at sea level but only half of its rated output flow rate at an elevation of 10,000 feet, at a given pressure. Due to these flow rate losses, previous dehumidifiers that operated with a constant flow rate required a compressor capable of producing about double the flow rate required at sea level, to enable the same system to operate satisfactorily at 10,000 feet. The present invention, however, can utilize a smaller compressor with lower output flow rates because the system does not require constant pressure and flow rate. The use of a smaller compressor not only reduces cost but also increases reliability and provides a more compact and light weight dehumidifier. In a preferred embodiment of the present invention, a Thomas compressor Model #607 is used.

Table 2 shows that increasing elevation leads to decreased compressor output flow rate, decreased system pressure and a decreased cartridge outlet dew point temperature. As described above, the present invention regulates itself so that these decreases in system pressure and flow rate do not adversely affect the dew point of the dehumidified air.

In addition, the dehumidifier of the present invention requires fewer components because the present invention does not require constant pressure or flow rate regulation. Fewer components result in lower assembly costs and higher reliability. In fact, the self-regulating nature of the present dehumidifier improves system reliability because minor defects in the dehumidifier that cause output flow loss, such as leaks or compressor wear, do not adversely effect the operation of the present invention. If the dehumidifier of the present invention experiences a small unexpected loss of output flow due to leaks or other damage to the dehumidifier, the present invention will maintain an acceptable dew point for the dehumidified air entering the dry air system 22 because the loss of air flow will increase the residence time of the air within the membrane cartridge 11.

Typically, the supply pressure, the flow rate and the size of the membrane cartridge are selected to supply a particular dry air system 22 with dehumidified air having the desired dew point. The present invention, however, allows the decrease of the flow rate and system pressure while still providing dehumidified air at the appropriate dew point for the dry air system 22.

Preferably, the dry air system 22 is a tightly sealed system, such as a waveguide system (or other signal transmission media), so that the induction of the pressurized dehumidified air pressurizes the system 22. A pressurized system prevents humid atmospheric air from seeping into the system 22, thereby preserving the low humidity level of the air. Since the dehumidified air cannot rapidly escape from the sealed system 22, the compressor 11 does not need to operate continuously in order to effectively dehumidify the air contained within the system 22. Therefore, in order to optimize the efficiency of the dehumidifier 10, the compressor 11 is operated intermittently. This intermittent operation may be cyclical, using a simple control which automatically switches the compressor 11 on and off at regular time intervals. Alternately, a pressure sensor within the dry air system 22 can trigger the switching on and off of compressor 11.

Although the present invention has been described with particular reference to controlling the dew point of air, the invention is also applicable to other gases or gas mixtures such as hydrogen, carbon dioxide, carbon monoxide, helium, nitrogen, oxygen, argon, hydrogen sulfide, nitronic oxides, ammonia, and hydrocarbons of one to five carbon atoms such as methane, ethane and propane. The cartridge 17 must be provided with a different membrane 18 and/or treatments for certain of these gases, as described for example in U.S. Pat. Nos. 4,230,463; 4,472,175; 4,486,202; 4,575,385; 4,597,777; 4,614,524; 4,654,055 and 4,728,345.

TABLE 1

Effect of system pressure across a .014 inch diameter metal orifice

| SYSTEM SUPPLY PRESSURE (PSIG) | TYPICAL OUTLET FLOW RATE (SCFH) |
|---|---|
| 20 | 6.0 |
| 30 | 6.7 |
| 40 | 8.2 |
| 50 | 9.6 |
| 60 | 11 |
| 70 | 13 |
| 80 | 15 |

TABLE 2

Effect of elevation to system pressure and cartridge outlet dew point

| DEHUMIDIFIER ELEVATION (FT) | CARTRIDGE OUTLET FLOW RATE (SCFM) | CARTRIDGE FEED PRESSURE (PSIG) | CARTRIDGE OUTLET DEW POINT (C.) |
|---|---|---|---|
| Sea Level | .30 | 95 | −50 |
| 4,000 | .25 | 81 | −52 |
| 8,000 | .21 | 67 | −52 |
| 12,000 | .18 | 55 | −54 |

I claim:

1. An apparatus for producing dehumidified air and maintaining a desired dew point for said dehumidified air that is suitable for a dry air system, said apparatus being operable at altitudes of up to 10,000 feet to produce said dehumidified air at said desired dew point, said apparatus comprising:

a membrane cartridge having an air inlet where air enters said membrane cartridge, said membrane cartridge including a membrane that removes water vapor or other fluid from the air that enters said membrane cartridge through said air inlet and passes dehumidified air through a dehumidified air outlet where said dehumidified air is expelled from said membrane cartridge and further including a fluid exit where water vapor or other fluid is expelled from said membrane cartridge;

a source of pressurized air connected to said air inlet of said membrane cartridge, said source supplying pressurized air to said air inlet of said membrane cartridge at a system pressure and flow rate that varies in relation to the altitude and associated ambient pressure in which said apparatus is operated, said source of pressurized air being permitted to produce said pressurized air at output pressure levels lower than 90 psi in response to changes in said altitude and associated ambient pressure said apparatus being operable with said system pressure lower than 90 psi in response to said source of pressurized air producing said pressurized air at output pressure levels lower than 90 psi; and a restrictive device connected to said dehumidified air outlet linking said system pressure and said flow rate together such that changes in said system pressure are followed in a desired relationship by changes in said flow rate, said changes producing a proper combination of said pressure and said flow rate for maintaining the dew point of said dehumidified air below a preselected temperature regardless of changes in operating altitude and associated changes in ambient pressure.

2. The apparatus of claim 1 wherein said source of pressurized air is a compressor.

3. The apparatus of claim 1 further comprising an orifice positioned between said source of pressurized air and said air inlet of said membrane cartridge for releasing excess pressurized air from said apparatus before said pressurized air is supplied to said air inlet of said membrane cartridge.

4. The apparatus of claim 1 wherein said restrictive device includes an orifice.

5. The apparatus of claim 1 that includes a filtration device connected to said source of pressurized air that filters fluids from said pressurized air before said pressurized air enters said membrane cartridge, said filtration device including a drain for expelling water accumulated from said filtration device, said water being expelled from said filtration device regardless of changes in system pressure.

6. The apparatus of claim 5 wherein said filtration device does not consume excessive air flow from said source of pressurized air.

7. The apparatus of claim 6 wherein said drain includes an automatic float valve for opening said drain only when fluids are accumulated from said filtration device.

8. The apparatus of claim 6 further comprising a fixed bleed orifice for removing fluid collected in said filtration device.

9. The apparatus of claim 1 that includes valve means positioned between said source of pressurized air and said air inlet of said membrane cartridge, said valve means preventing the flow of dehumidified air back towards the source of pressurized air.

10. An apparatus for producing dehumidified air and maintaining a desired dew point for said dehumidified air that is suitable for a dry air system, said apparatus being operable at altitudes of up to 10,000 feet to produce said dehumidified air at said desired dew point, said apparatus comprising:

a membrane cartridge having an air inlet where air enters said membrane cartridge, said membrane cartridge including a membrane that removes water vapor or other fluid from the air that enters said membrane cartridge through said air inlet and passes dehumidified air through a dehumidified air outlet where said dehumidified air is expelled from said membrane cartridge and further including a fluid exit where water vapor or other fluid is expelled from said membrane cartridge;

a source of pressurized air for supplying pressurized air to said apparatus at an output pressure and flow rate that varies in relation to the altitude and associated ambient pressure in which said apparatus is operated, said output pressure being permitted to fall below 90 psi in response to changes in said altitude and associated ambient pressure;

an orifice located between said source of pressurized air and said air inlet of said membrane cartridge for releasing excess pressurized air from said apparatus before said pressurized air is supplied to said air inlet of said membrane cartridge, said pressurized air being provided to said membrane cartridge at a system pressure and flow rate that varies in relation to the altitude and associated ambient pressure in which said apparatus is operated, said apparatus being operable with said system pressure lower than 90 psi in response to said source of pressurized air producing said pressurized air at output pressure levels lower than 90 psi; and a restrictive device connected to said dehumidified air outlet for linking said system pressure and said flow rate together such that changes in said system pressure are followed in a desired relationship by changes in said flow rate, said changes producing a proper combination of said pressure and said flow rate for maintaining the dew point of said dehumidified air below a preselected temperature regardless of changes in operating altitude and associated changes in ambient pressure.

11. The apparatus of claim 10 wherein said source of pressurized air is a compressor.

12. The apparatus of claim 10 wherein said restrictive device includes an orifice.

13. The apparatus of claim 10 that includes a filtration device connected to said source of pressurized air that filters fluids from said pressurized air before said pressurized air enters said membrane cartridge, said filtration device including a drain for expelling water accumulated from said filtration device said water being expelled from said filtration device regardless of changes in system pressure.

14. The apparatus of claim 13 wherein said filtration device does not consume excessive air flow from said source of pressurized air.

15. The apparatus of claim 14 wherein said drain includes an automatic float valve for opening said drain only when fluids are accumulated from said filtration device.

16. The apparatus of claim 14 further comprising a fixed bleed orifice for removing fluid collected in said filtration device.

17. The apparatus of claim 10 that includes valve means positioned between said source of pressurized air and said air inlet of said membrane cartridge, said valve means preventing the flow of dehumidified air back towards said source of pressurized air.

\* \* \* \* \*